UNITED STATES PATENT OFFICE.

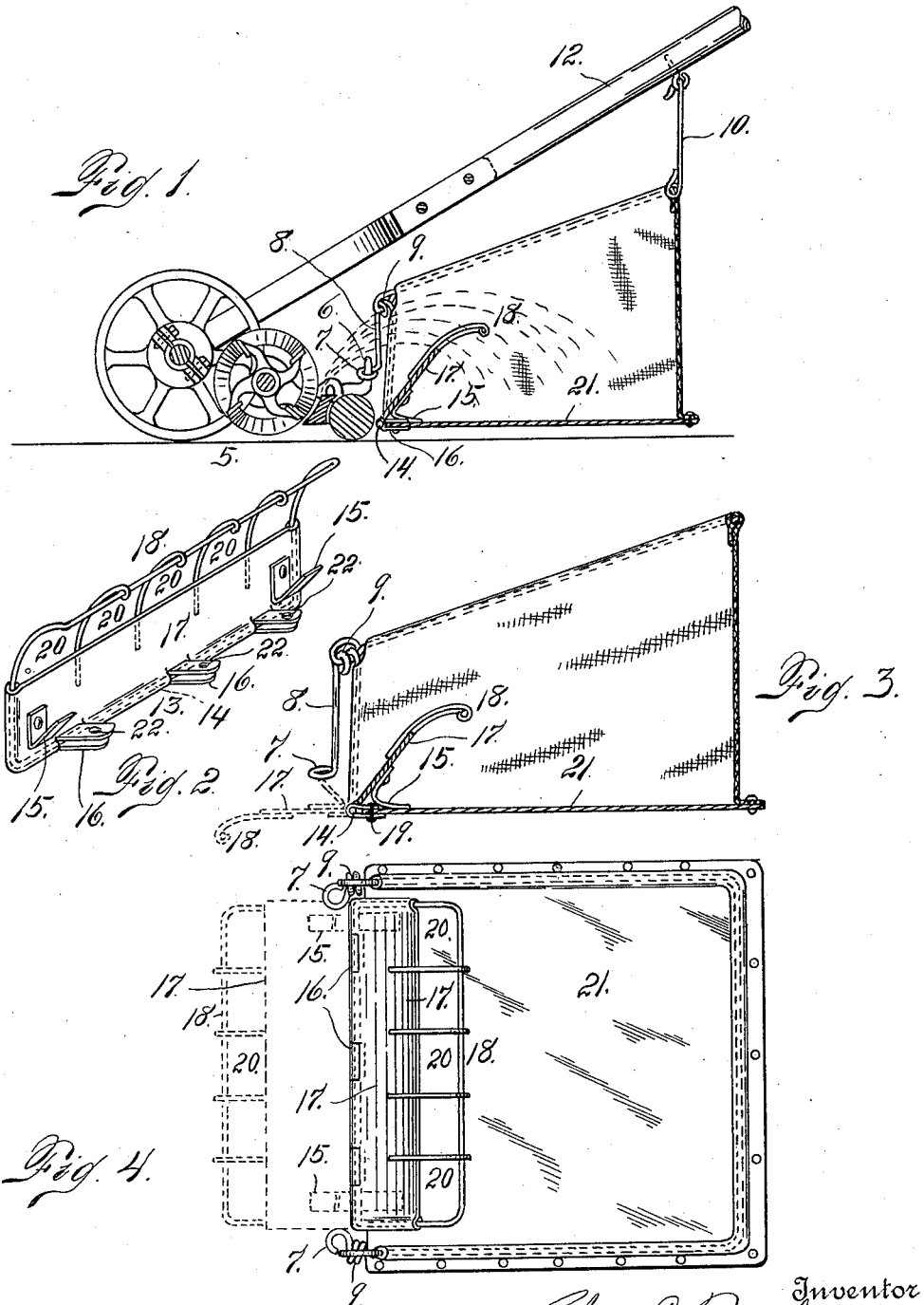

CHARLES S. BONHAM, OF DENVER, COLORADO.

GRASS-CATCHER FOR LAWN-MOWERS.

1,029,527. Specification of Letters Patent. Patented June 11, 1912.

Application filed July 17, 1911. Serial No. 638,869.

*To all whom it may concern:*

Be it known that I, CHARLES S. BONHAM, a citizen of the United States, residing in the city and county of Denver and State of Colorado, have invented certain new and useful Improvements in Grass-Catchers for Lawn-Mowers; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in grass catching attachments for lawn mowers, my object being to equip the grass catcher with a sort of shield adapted to partly close the front part of the catcher to prevent the grass from falling out under certain circumstances during the grass-cutting operation.

It very frequently happens that, in cutting grass, it is necessary to use the mower on a comparatively steep terrace, thus throwing the catcher into such a position that, under ordinary circumstances, more or less of the grass will fall out of the catcher, making it necessary to use a rake afterward.

My improvement is intended to overcome this difficulty and consists of a sort of shield normally occupying an inwardly-inclined position, and, as illustrated in the drawing, at an angle of about forty-five degrees (45°), whereby the grass is allowed to enter the catcher above the shield and fall down in the rear thereof, the shield preventing it from falling out under the circumstances heretofore named, and making it practicable to load the catcher more heavily than is otherwise possible. By virtue of this feature, the catcher can be used much longer without emptying than would be possible with the old form of construction. This shield, while normally occupying an inwardly-inclined position, as heretofore stated, will readily fall outwardly to a position in the plane of the bottom of the catcher after the latter has been detached and tilted to a suitable position for discharging its contents, since the shield is hinged to the forward end of the bottom of the catcher, stops being employed to support the shield in its normal position, as heretofore explained,—that is to say, in a position at an angle of about forty-five degrees (45°). This angle, of course, may be varied as circumstances may require, but it is, of course, necessary that there be a sufficient opening at the front of the catcher and above the shield to permit the grass to enter freely. In order that the shield may not serve as an obstruction to the entrance of the grass to the catcher the upper portion of the shield may, if desired, be formed of a coarse screen sufficiently open to allow the grass to readily pass therethrough. Any suitable specific construction for this shield may be employed whether the same be made entirely of wire and comparatively open, or of a piece of sheet metal. Ordinarily, a piece of sheet metal or an entirely closed shield will be practicable, particularly if the user of the mower runs the same at a considerable speed, thus causing the grass to fly rearwardly with considerable impetus, causing it to pass above the shield before falling.

Having briefly outlined my improved construction, I will proceed to describe the same in detail, reference being made to the accompanying drawing in which is illustrated an embodiment thereof.

In this drawing: Figure 1 is a central vertical section, taken through a lawn mower equipped with a grass catcher having my improvement applied thereto. Fig. 2 is a perspective view in detail of my improved shield. Fig. 3 is a central section, taken through a grass catcher shown in detail, the same being provided with my improvement, the parts being shown on a scale somewhat greater than in Fig. 1. Fig. 4 is a top plan view of the same. In both Figs. 3 and 4, the grass retaining shield is shown in two positions, the full line position being its normal position when in use, and the dotted line position being that which it occupies during the emptying of the catcher.

The same reference characters indicate the same parts in all the views.

Let the numeral 5 designate a lawn mower of ordinary construction, the same being equipped with projections 6 on opposite sides, arranged to receive eyes 7 formed at the lower extremities of depending rods 8, whose upper extremities are connected, as shown at 9, with the forward part of the top portion of the grass catcher. The projections 6, by virtue of their engagement with the rods 8, serve to connect the grass catcher with the mower 5 in front, the catcher being further connected with the mower by means of a rod 10 having its extremities hook-shaped, centrally connected with the rear upper part of the catcher at one extremity, and with the handle 12 of the mower at its opposite extremity. So far as the connection of the grass catcher with the mower is concerned, the construction is that usually employed and nothing is claimed thereon.

My improved feature consists of a shield or plate, which is hinged to the lower front part of the grass catcher by means of a rod 14, the shield having angle stops 15 applied to its rear surface and serving to support the shield in a suitable position during the use of the grass catcher in connection with the mower. These angle stops may be so arranged and constructed as to cause the shield to occupy any desired position of inclination. The position shown in the drawing, whereby the shield occupies an angle of approximately forty-five degrees (45°) has been found, in actual practice, to give good results, though it is evident that a position of the shield, where the angle is either greater or less than forty-five degrees (45°) would also give satisfactory results. Care, of course, must be taken to so arrange and construct the shield that it shall not present an obstruction to the entrance of the grass to the catcher, while, at the same time, care must be taken to so position the shield that it shall prevent the escape of the grass at the front part of the catcher during the operation of the machine.

As illustrated in the drawing, the shield is composed of a sheet metal member 17, and a wire member 18, the wire member constituting the upper part of the shield and being curved slightly downwardly from the plane of the part 17 to facilitate the entrance of the grass to the catcher, when the shield is in use.

The lower part 17 of the shield carries the rod 14, to which are applied a number of hinged members 16 which may be riveted or otherwise suitably secured to the forward edge of the bottom 21 of the catcher, the hinged members 16 being made in the form of clips composed of parallel members adaped to slip over the forward edge of the bottom of the catcher. These hinged clips are provided with openings 22 through which rivets 19, or other suitable fastening devices, may be passed after the clips have been applied to the bottom of the catcher, as heretofore explained.

It will be understood that, when the hinge clips are applied to the bottom of the catcher, the clips remain stationary, while the shield is allowed to turn freely on the clips, the wire member 14 being journaled in the closed ends of the clip members.

From the foregoing description, the use of my improvement will be readily understood. When the grass catcher is in use, and the mower is in operation, the grass, as it leaves the cutting member of the mower, will pass rearwardly in a sort of stream, the grass in this event assuming approximately the position indicated by dotted lines in Fig. 1. Under these circumstances, as illustrated in the drawing, a portion of the grass will pass through the openings 20 in the upper wire of the shield. Of course, this shield may be relatively shorter than illustrated in the drawing and formed of a closed plate, the arrangement being such that the grass must pass over the upper edge of the shield when the latter is in use, or, as heretofore explained, the shield may be of such construction that it will be practicable for the grass, as it flies from the cutting member of the mower, to pass through the shield at all parts thereof. This construction would be practicable, while, at the same time, the shield would form a dam to prevent the grass from moving forwardly out of the catcher during the operation of the mower, under the circumstances heretofore described.

Having thus described my invention, what I claim is:

1. A grass catcher for lawn mowers equipped with a shield applied to the forward extremity of the catcher, the said shield being hinged to the catcher and normally occupying an upwardly and rearwardly-inclined position, the shield being so located that it shall form a dam to prevent the escape of the grass, while, at the same time, allowing the grass to pass rearwardly from the cutter to enter the catcher above and through the shield, substantially as described.

2. A grass catcher equipped at its forward extremity with a hinged shield, provided with stops on its inner surface adapted to support the shield in an upwardly and rearwardly-inclined position, the shield being adapted, when thrown forwardly, to occupy a plane approximately the same as that of the bottom of the catcher, whereby the grass is allowed to pass freely out of the forward extremity of the catcher.

3. A grass catcher for lawn mowers, equipped with a hinged shield, which is normally rearwardly and upwardly inclined, the shield being freely movable on its hinge and provided with stops adapted to support it in its position of rearward inclination, when the catcher is in use, the shield being arranged to swing forwardly to occupy a plane approximately the same as that of the bottom of the catcher, substantially as described.

4. A grass catcher for lawn mowers, equipped with a shield hinged at the forward edge of the same and normally occupying an upwardly and rearwardly inclined position, means for supporting the shield in position to prevent the escape of grass while the catcher is in use, and at the same time allowing the grass to enter the catcher freely as it flies from the cutter, the shield being free to open forwardly to permit the discharge of grass, substantially as described.

5. A grass catcher for lawn mowers equipped with a shield hinged at the forward edge of the same, means for supporting the shield in position to prevent the escape of grass while the catcher is in use and at the same time allowing the grass to enter the catcher freely therethrough as it flies from the cutter, substantially as described.

In testimony whereof I affix my signature in presence of two witnesses.

CHARLES S. BONHAM.

Witnesses:
EDGAR N. GREEN,
F. E. BOWEN.

Copies of this patent may be obtained for five cents each, by addressing the "Commissioner of Patents, Washington, D. C."